(12) United States Patent
Roth

(10) Patent No.: US 12,337,805 B2
(45) Date of Patent: Jun. 24, 2025

(54) MOTOR MOUNTS FOR TRAILER LANDING GEAR

(71) Applicant: EZWinder, LLC, Memphis, TN (US)

(72) Inventor: Terry Roth, Austin, TX (US)

(73) Assignee: EZWINDER, LLC, Memphis, TN (US)

( * ) Notice: Subject to any disclaimer, the term of this patent is extended or adjusted under 35 U.S.C. 154(b) by 377 days.

(21) Appl. No.: 17/889,638

(22) Filed: Aug. 17, 2022

(65) Prior Publication Data

US 2023/0068084 A1 Mar. 2, 2023

Related U.S. Application Data

(60) Provisional application No. 63/236,283, filed on Aug. 24, 2021.

(51) Int. Cl.
*B60S 9/04* (2006.01)
*B60D 1/66* (2006.01)

(52) U.S. Cl.
CPC . *B60S 9/04* (2013.01); *B60D 1/66* (2013.01)

(58) Field of Classification Search
CPC ...... B60S 9/00; B60S 9/02; B60S 9/04; B60S 9/08; B60S 9/12; B60S 9/22; B60P 1/44; B60P 1/4407; B60P 1/4414; B60P 1/4471; B60P 1/4485
See application file for complete search history.

(56) References Cited

U.S. PATENT DOCUMENTS

| 10,807,571 B1 * | 10/2020 | Myrex | B60S 9/22 |
| 2005/0073141 A1 * | 4/2005 | Baird | B60P 1/56 |
| | | | 280/766.1 |

* cited by examiner

*Primary Examiner* — C. A. Rivera

(74) *Attorney, Agent, or Firm* — Thomas | Horstemeyer, LLP

(57) ABSTRACT

Disclosed are embodiments of motor mounts for attaching a motor to an input shaft of trailer landing gear. One embodiment of the motor mount has an L-shaped frame bracket having first and second plates at right angle. The first plate is secured to a frame part of the trailer. The motor mount also has an L-shaped motor bracket having first and second plates at a right angle. The motor bracket first plate has an opening therethrough. The motor bracket second plate is secured to the frame bracket second plate. A gearbox is operatively connected to the electric motor and is secured to the motor bracket first plate. The gearbox has an outwardly extending drive mechanism that extends through the opening in the motor bracket first plate and connects to the landing gear input shaft. Another embodiment is a Z-shaped motor mount that includes first, second, and third plates.

14 Claims, 8 Drawing Sheets

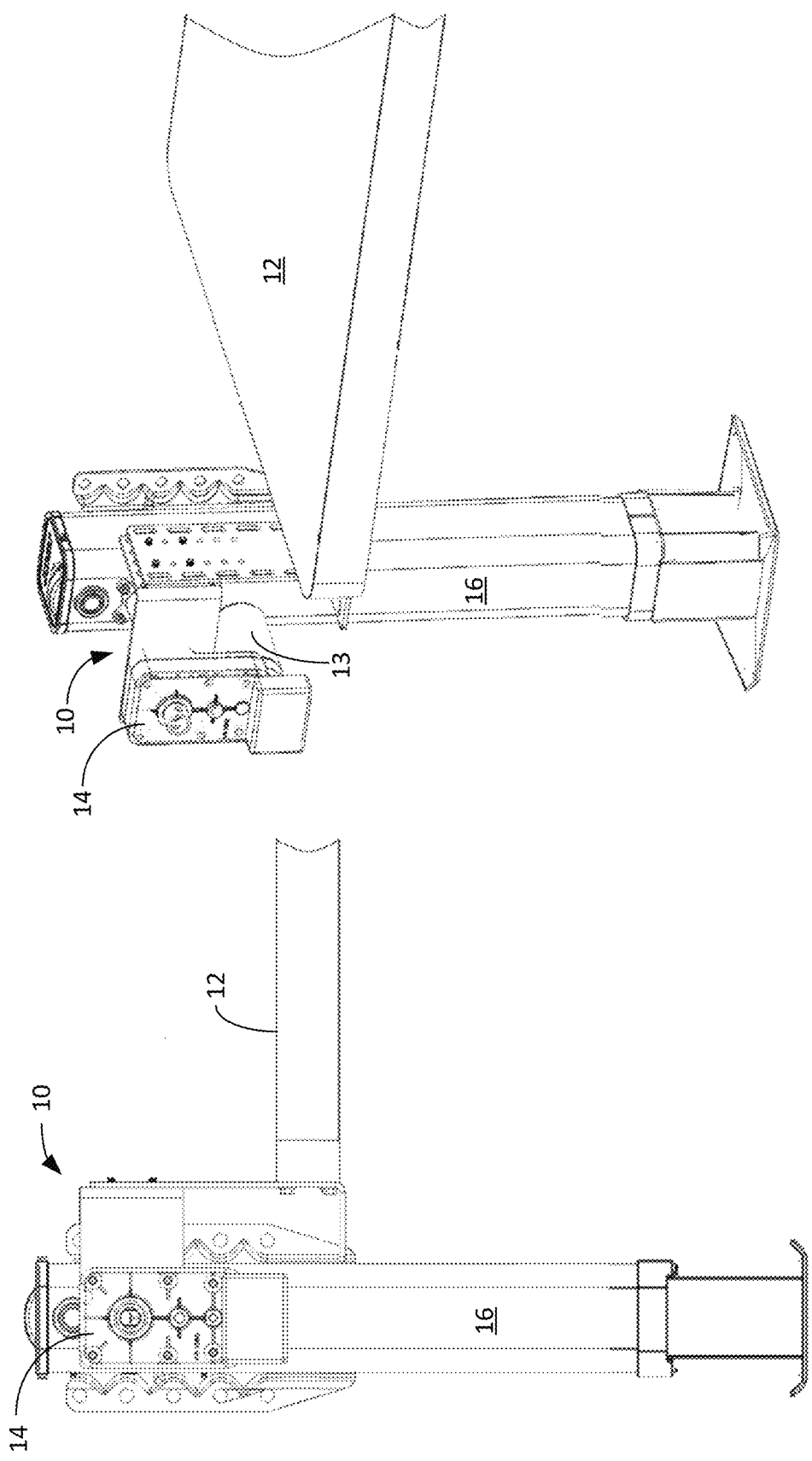

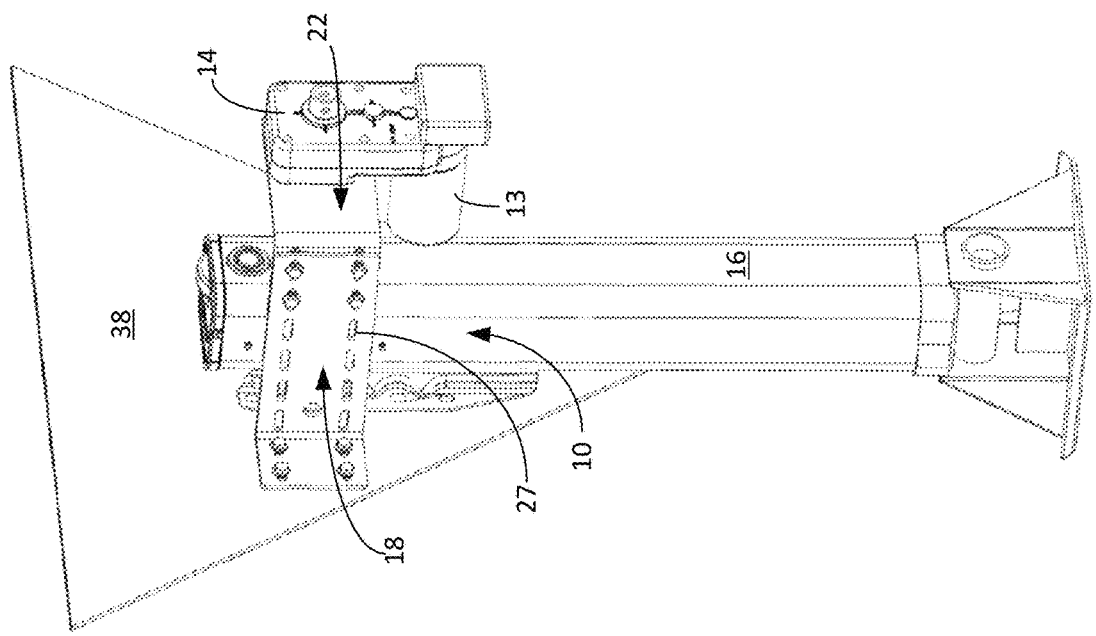
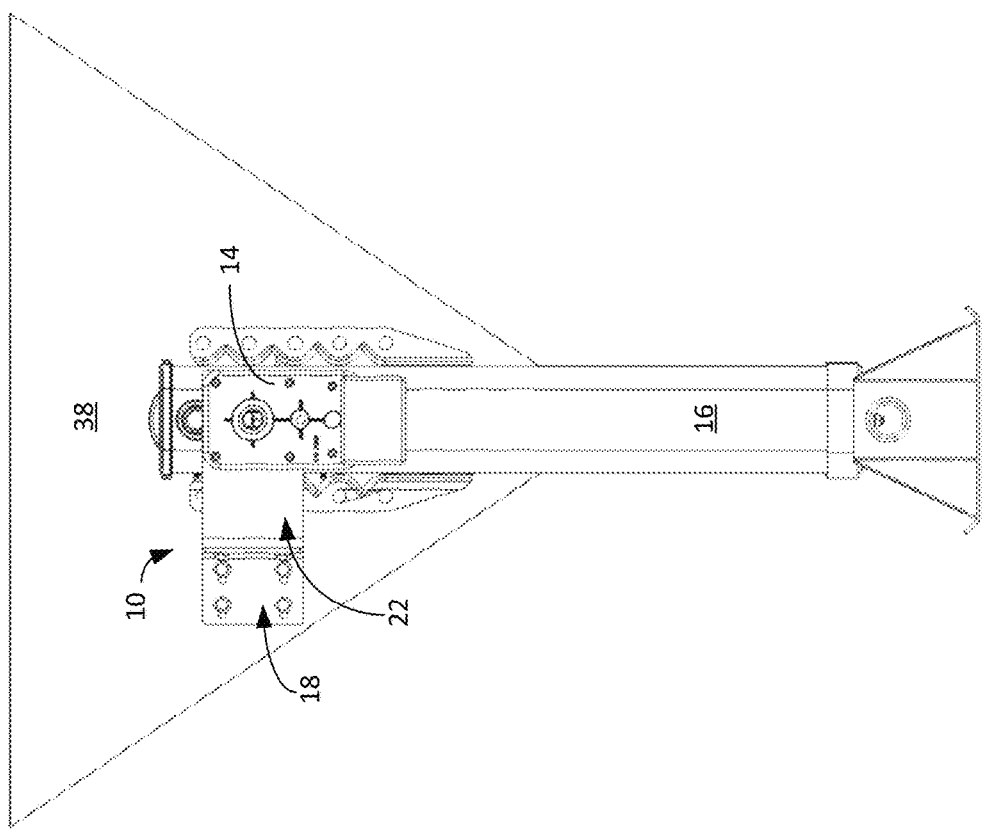
FIG. 3A
FIG. 3B

MOTOR MOUNTS FOR TRAILER LANDING GEAR

CLAIM OF PRIORITY

The present application claims the benefit of and priority to provisional application No. 63/236,283, filed on Aug. 24, 2021, which is incorporated by reference herein in its entirely.

FIELD OF THE INVENTION

The present invention relates generally to a motorized system for operating landing gear of a trailer, and more particularly, to motor mounts for attaching an electric motor to a rotatable input shaft of landing gear associated with a trailer so that the input can be rotated with the motor.

BACKGROUND OF THE INVENTION

Many trailers have front landing gear for vertical support of the front of the trailer when the tractor, or truck, is detached. Such landing gear has at least one, but generally two, telescoping or jack-type landing gear legs and corresponding feet that extend downwardly from the floor or frame of the trailer, bolted, clamped or welded. Each leg is operatively attached to a screw and follower or a rack and pinion gear arrangement, which is in turn driven by a landing gear shaft that extends between the legs and which causes extension or retraction of the legs and feet depending on the direction in which it is rotated. It is typically rotated manually by a person with a crank handle that is attached to an input shaft, or shift shaft.

Heavy duty $5^{th}$ wheel, gooseneck, and class 5 hitch/pintle mount trailers, such as large utility, dump, flatbed, deckover, and specialty trailers, have 10,000 lb. to 35,000 lb. lifting capacity landing gear with a single or dual landing gear configuration and single or dual speed crank to achieve the lift rating necessary to raise or lower the front of the trailer to the necessary height for attaching the trailer to a tow vehicle.

These heavier duty commercial and consumer trailers can reach an astounding GVWR rating up to 60,000 lbs., which makes these trailers particularly hard to raise and tiresome to lower when loaded, using the manually operated crank handle. The need for landing gear cranking assistance is imperative as many of these trailers have single speed landing gear that makes it almost impossible to crank when loaded. Even trailers with a two speed landing gear setup still require the need to crank the landing gear, putting undue strain on one's shoulder, arm, and back. With aging drivers/owners, this can create health, safety problems and over time, forcing driver/owners to retire early or reduce the number of jobs they can take on. For the younger trailer owners, they want things simpler and with less strenuous work.

The known, existing options available to assist owners and alleviate strain on cranking landing gears on less than 60,000 lb. trailers are as follows:

(1) Bulldog 12,000 lb. landing gear motor that requires the change out of the main pinion gear and input shaft to install their motor and is limited to 12,0000 lb. load.

(2) A full hydraulic landing gear system that requires specialized hydraulic landing gear, hydraulic pumps and hydraulic lines that require continuous maintenance and complex installation.

(3) A pneumatic landing gear system that requires an electric air pump, air canister, and specialty landing gear or motor.

(4) A motorized system as described in U.S. Pat. No. 10,807,571, which is incorporated by reference in its entirety, which involves attaching an electric motor to the input shaft of the landing gear of the trailer. This motorized system is capable of working on trailers with landing gear rated from as low as 10,000 lbs. to as high as 65,000 lbs or more. Furthermore, this motorized system is commercially available for purchase from Asia Sourcing Corporation, Memphis, Tennessee, U.S.A, under the trademark "EZ Winder."

The present invention is related to an adjustable motor mount for the aforementioned motorized system that effectively mounts the motor while preventing rotation during operation and while permitting many different mounting configurations to accommodate many different landing gear types.

SUMMARY OF THE INVENTION

Various embodiments of motor mounts are disclosed. The motor mount enables mounting of an electric motor to the crankshaft of landing gear associated with a trailer while preventing rotation of the motor during operation and permitting many different mounting configurations to accommodate many different trailer types.

One embodiment, among others, can be summarized as follows. An adjustable motor mount has an L-shaped frame bracket and an L-shaped motor bracket. The frame bracket has first and second plates. The first and second plates are connected substantially at a right angle. The first plate is secured to a frame part, for example but not limited to, the top or side of the bed of the trailer. The motor bracket has first and second plates. The first and second plates are connected substantially at a right angle. The motor bracket first plate has an opening for permitting extension of a drive mechanism therethrough. The motor bracket second plate is secured to the frame bracket second plate. A gearbox is operatively connected to the electric motor. The gearbox is secured to the motor bracket first plate. The gearbox has the outwardly extending drive mechanism that is rotated by the motor in combination with the gearbox. The drive mechanism has an elongated longitudinal body that extends through the opening in the motor bracket first plate. The longitudinal body is positioned substantially parallel to both of the second plates of the frame and motor brackets. The drive mechanism connects, directly or indirectly, to and is capable of rotating the landing gear input shaft of the trailer.

Another embodiment, among others, has a similar structure as described in the previous paragraph but further includes a means for securing together the second plates while permitting limited movement of the second plates relative to each other toward and away from the input shaft in order to accommodate a two-speed jack (or two-speed input shaft) operation associated with the landing gear.

Another embodiment, among others, is a Z-shaped motor mount. The motor mount has a bracket with first, second, and third plates. The first and second plates are connected substantially at a right angle. The second and third plates are connected substantially at a right angle. The first and third plates are positioned substantially parallel. The first plate is secured to a frame part of the trailer, the first plate has an opening therethrough. A gearbox is operatively connected to the electric motor. The gearbox is secured to the first plate. The gearbox has an outwardly extending drive mechanism that is rotated by the motor and gearbox. The drive mechanism has an elongated longitudinal body that extends through the opening in the motor bracket first plate. The drive mechanism connects, directly or indirectly, to and is capable of rotating the input shaft of the landing gear of the trailer.

Other embodiments, systems, apparatus, methods, features, and advantages of the present invention will be or become apparent to one with skill in the art upon examination of the following drawings and detailed description. It is intended that all such additional embodiments, systems, apparatus, methods, features, and advantages be included within this description, be within the scope of the present invention, and be protected by the accompanying claims.

BRIEF DESCRIPTION OF THE DRAWINGS

Many aspects of the disclosure can be better understood with reference to the following drawings. The parts in the drawings are not necessarily to scale, emphasis instead being placed upon clearly illustrating the principles of the present disclosure. Moreover, in the drawings, like reference numerals designate corresponding parts throughout the several views.

FIG. 1A is a front view thereof. FIG. 1B is a perspective view showing front and right sides thereof. FIG. 1C is a perspective view showing front and left sides thereof. FIG. 1D is a left side view thereof.

FIGS. 2A-2D shows a second embodiment of a motor mount, which is adjustable, for a single-speed and two-speed landing gear associated with a trailer with a ball/pintle mount hitch wherein the frame bracket is secured to a side of the trailer bed or other frame member. Specifically, FIG. 2A is a front view thereof. FIG. 2B is a perspective view showing front and right sides thereof. FIG. 2C is perspective view showing front and left sides thereof. FIG. 2D is a left side view thereof.

FIGS. 3A-3D shows a third embodiment of a motor mount, which is adjustable, for single-speed and two-speed landing gear associated with a trailer with a gooseneck hitch. Specifically, FIG. 3A is a front side view thereof. FIG. 3B is a perspective view showing front and left sides thereof. FIG. 3C is a right side view thereof. FIG. 3D is a top view thereof.

FIG. 4A is a front view thereof. FIG. 4B is a perspective view showing front and left sides thereof. FIG. 4C is a top view thereof.

DETAILED DESCRIPTION OF THE PREFERRED EMBODIMENT(S)

Figure 1B:
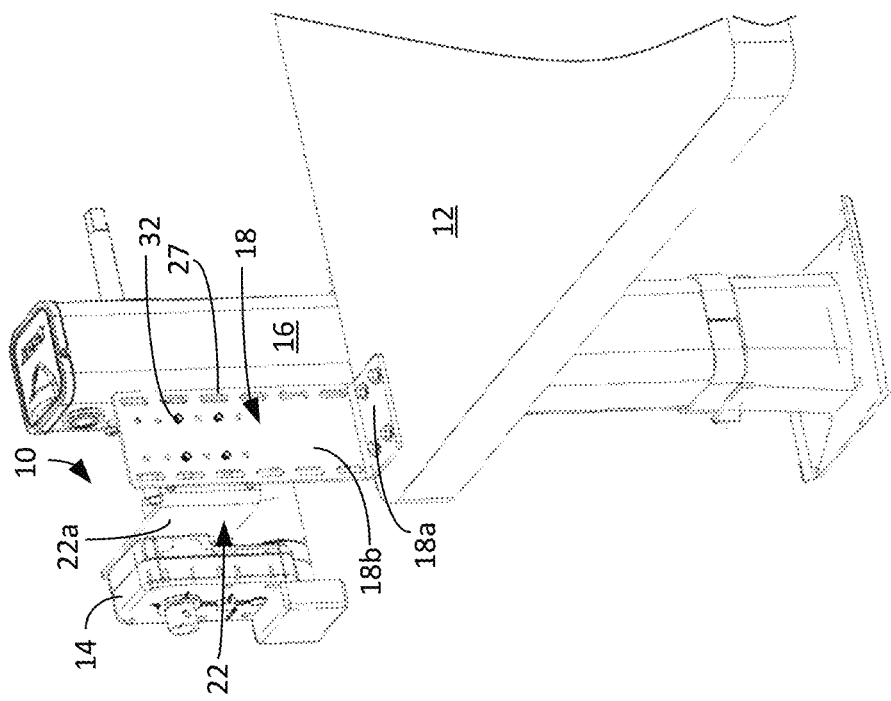
FIGS. 1A-1D shows a first embodiment of a motor mount, which is adjustable, for single-speed and two-speed landing gear associated with a trailer with a ball/pintle mount hitch wherein the frame bracket is secured to the top or bottom of the trailer bed. Specifically.
Figure 1A:
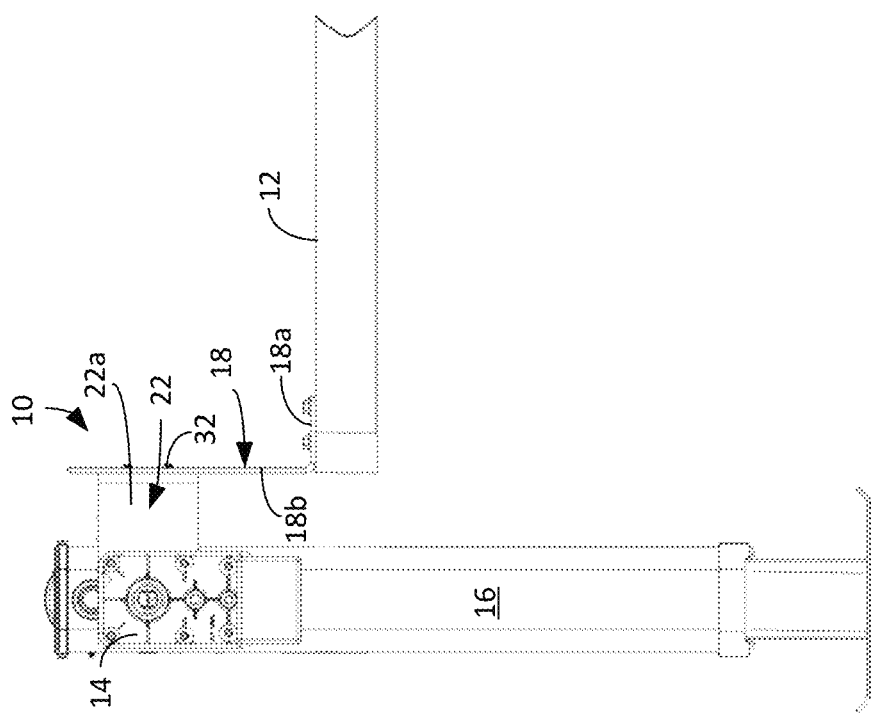

FIGS. 1A-1D illustrates a first embodiment of a motor mount 10, which is adjustable. The motor mount 10 is designed for use with single-speed and two-speed landing gear associated with a trailer with a ball/pintle mount hitch wherein the frame bracket 10 is secured to a trailer frame part, which in this case is the top of the trailer bed 12. The adjustable motor mount 10 is used to secure an electric motor 13 with a gearbox 14 to the trailer bed 12 and prevent rotation of the motor 13 and gearbox 14 during operation. The gearbox 14 has one or more gears for increasing the torque of the motor 13. The front of the trailer bed 12 is raised and lowered, at least in part, by telescoping jack leg 16, only one of which is shown for simplicity.

The adjustable motor mount 10 includes an L-shaped frame bracket 18 having first and second plates 18a, 18b. The first and second plates 18a, 18b are connected substantially at a right angle. The first and second plates 18a, 18b can be produced as a singular part or as two separate parts that are connected together via any suitable technique, for example, welding. The first plate 18a is secured to the bed 12 of the trailer.

More specifically, the second plate 18b of the frame bracket 18 has an elongated longitudinal body having a generally planar, opposing, parallel first and second surfaces. The first and second surfaces extend between opposing, parallel, right and left edges and extend between proximal and distal ends in a direction that is orthogonal to the right and left edges. The proximal end of the second plate 18b of the frame bracket 18 is connected to the first plate 18a of the frame bracket.

The adjustable motor mount 10 further includes an L-shaped motor bracket 22 having first and second plates 22a, 22b. The first and second plates 22a, 22b are connected substantially at a right angle. The first and second plates 22a, 22b can be produced as a singular part or as two separate parts that are connected together via any suitable technique, for example, welding. The motor bracket first plate 22b has an opening therethrough to permit passage of a rotatable, motor driven, drive mechanism that is connected to the input shaft of the landing gear. In some embodiments, the drive mechanism is a rotatable cylindrical shaft, which is in turn connected to the input shaft via any suitable linkage, for example, a coupling. In the preferred embodiment, the motor bracket first plate 22a has a sufficient circular opening therethrough designed to enable a rotatable, motor driven, cylindrical coupling 24 to extend through the first plate 22a. The motor bracket second plate 22b is secured to the frame bracket second plate 18b.

More specifically, the second plate 22b of the motor bracket 22 has an elongated longitudinal body having generally planar, opposing, parallel first and second surfaces. The first and second surfaces extend between opposing, parallel, right and left edges and extend between proximal and distal ends in a direction that is orthogonal to the right and left edges. The proximal end of the second plate 22b of the motor bracket 22 is connected to the first plate 22a of the motor bracket 22.

The gearbox 14 is secured to the motor bracket first plate 22a. The longitudinal body of the coupling 24 is positioned substantially parallel to both of the second plates 18b, 22b of the frame and motor brackets 18, 22. The coupling 24 is designed to connect to and drive the landing gear input shaft 26 of the trailer.

In this embodiment, the frame bracket 18 and the motor bracket 22 each have opposing parallel right and left edges. Moreover, the right and left edges of the frame bracket 18 are positioned substantially orthogonal, or perpendicular, to the right and left edges of the motor bracket 22.

In some embodiments, the first and second plates of both of the frame and motor brackets 18, 22 include a plurality of bolt holes for enabling the first plates 18a, 22a to be secured via bolts and nuts to the bed 12 and gearbox 14, respectively, and to enable the second plates 18b 22b to be secured together at a plurality of different positions relative to each other. In other embodiments, the foregoing parts, in whole or in part, can be welded, as opposed to using bolts and nuts.

In the preferred embodiment, the first and second plates of both of the frame and motor brackets 18, 22 include a two parallel pluralities of spaced bolt holes.

Figure 1D:
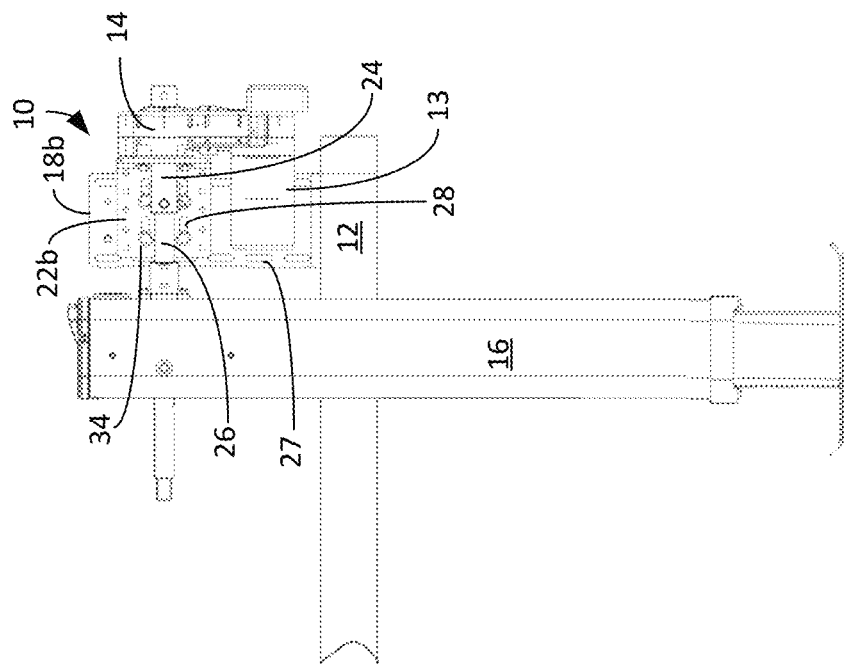
Figure 1C:
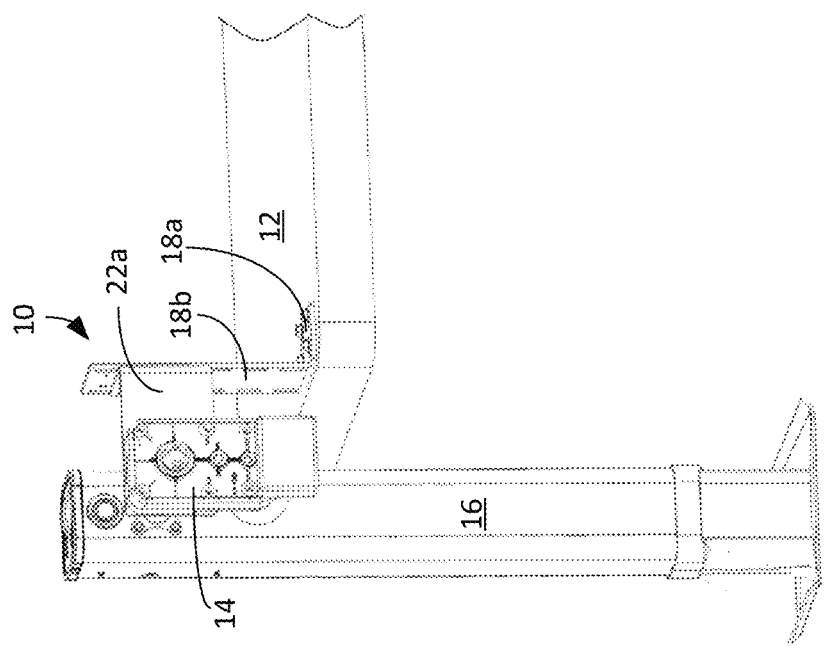
Figure 2D:
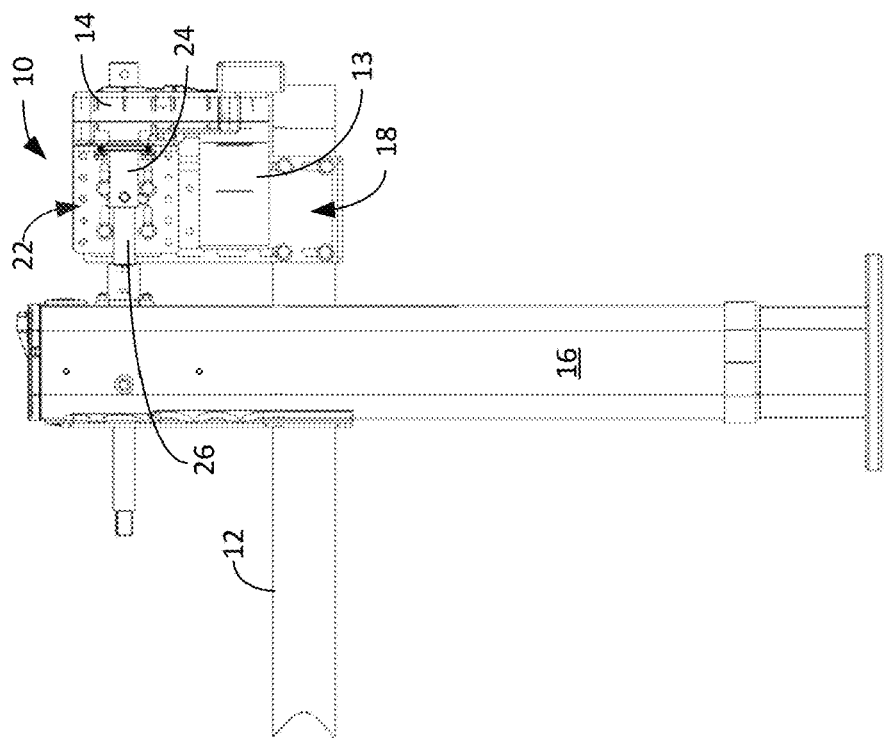
Figure 2C:
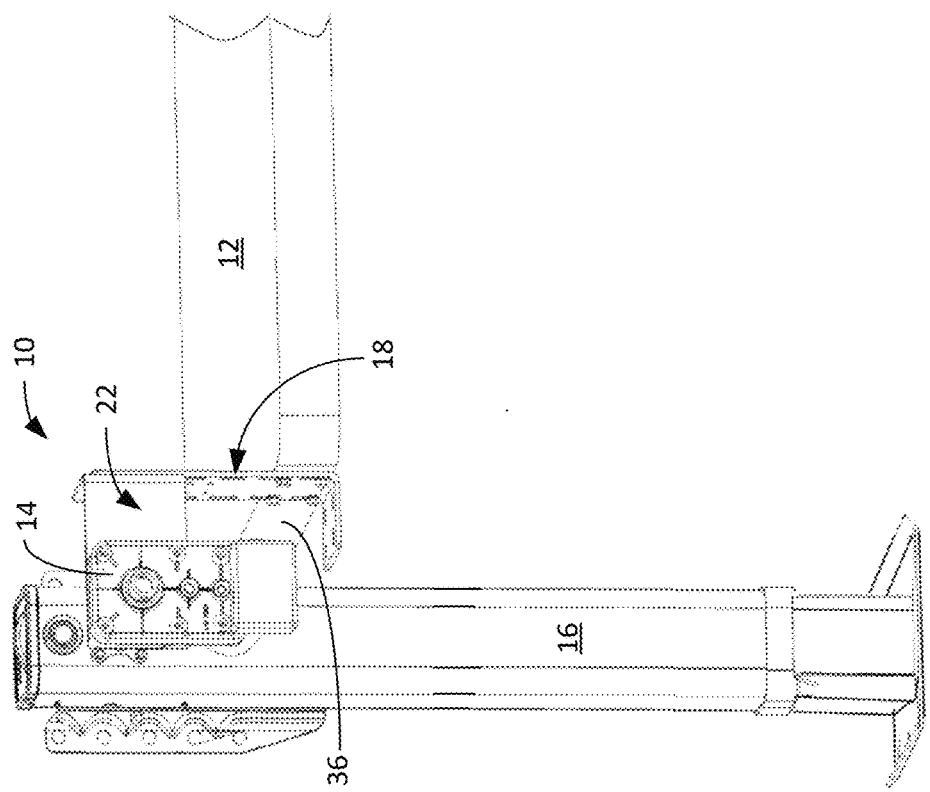
Figure 3D:
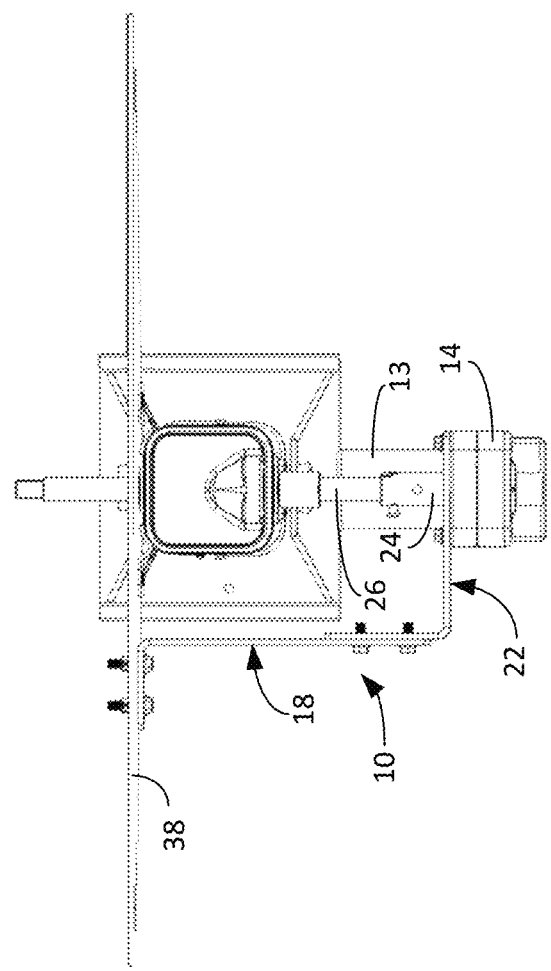
Figure 3C:
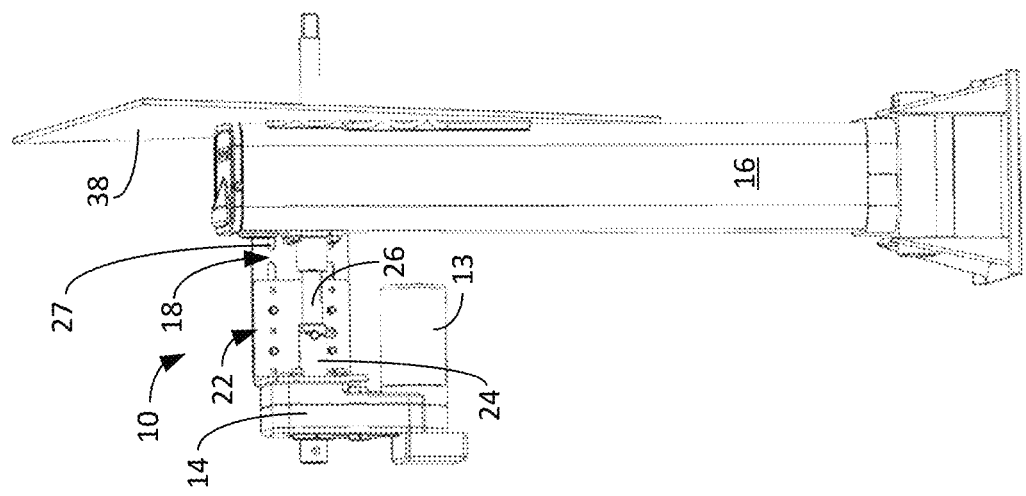

As shown in FIG. 1D, in the preferred embodiment, the adjustable motor mount 10 has a mechanism for permitting limited movement of the second plates 18b 22b relative to each other in a direction toward and away from the input shaft 26 in order to accommodate a two-speed jack operation associated with the landing gear. In order to accomplish the foregoing, the second plate 22b of the motor bracket 22 have a plurality of bolt holes 28 that are elongated in the direction from the proximal end to the distal end of the second plate 22b. A plurality of elongated bolts 32, preferably shoulder bolts, extend through respective bolt holes 28 to secure the second plates 18b, 22b of the frame and motor brackets 18, 22 while permitting relative horizontal movement of the second plates 18b, 22b of the frame and motor brackets 18, 22 in order to accommodate a two speed jack operation where the gearbox 14 needs to move horizontally during a switch between gears (because the input shaft 26 need to move outwardly). Each of the shoulder bolts 32 has a head, a smooth shank adjacent the head, and a threaded end region adjacent to the shank for receiving a respective nut. A plurality of nuts 34 are threaded onto respective bolts 32, as shown. Note that the positions of the heads of the bolts 32 and nuts 34, as shown, can be reversed (as with all other bolt arrangements described herein). In essence, the elongated bolt holes 28 permit limited horizontal movement of the second plates 18b 22b relative to each other in a direction toward and away from the input shaft 26 in order to accommodate a two-speed jack operation associated with the landing gear.

In alternative embodiments, instead of shoulder bolts 32, axil bolts, or bolts in combination with bushings, sleeves, or tubes could be utilized to accomplish the same or similar horizontal movement between the second plates 18, 22 to accommodate two-speed jack operation.

If the landing gear does not support two-speed jack operation, i.e., the landing gear has only a single speed and does not change gears, then the bolts 32 do not need to be shoulder bolts and can be bolts that do not have a smooth shank.

In some embodiments, a material sheet, for example but not limited to, Teflon or aluminum, may be situated between the second plates 18b, 22b of the frame and motor brackets 18, 22 that reduces friction to enable easier relative movement in the horizontal direction. In other embodiments, a coating, such as paint or other substance, may be applied to the contacting surfaces of the second plates 18b, 22b in order to reduce friction and enable easier relative movement. In still other embodiments, a material sheet in combination with a coating may be utilized in order to reduce friction.

FIGS. 2A-2D illustrates a second embodiment of a motor mount 10, which is adjustable. The motor mount 10 is designed for use with single-speed and two-speed landing gear associated with a trailer with a ball/pintle mount hitch wherein the frame bracket 18 is secured to a side 36 of the trailer bed 12. In this embodiment, the second plate 18b of the frame bracket 18 is used to secure the adjustable motor mount 10 to the trailer bed 12 as well as secure the frame bracket 18 to the second plate 22b of the motor bracket 22. The first plate 18a of the frame bracket 18 is essentially unused. Further, in this embodiment, the right and left edges of the frame bracket 18 are positioned substantially orthogonal, or perpendicular, to the right and left edges of the motor bracket 22. This embodiment also uses the elongated bolt holes 28 with shoulder bolts 32 and nuts 34 for securing the second plates 18b, 22b but permitting relative horizontal movement to accommodate two-speed jack operation. If the landing gear does not support two-speed jack operation, i.e., the landing gear has only a single speed and does not change gears, then the bolts 32 do not need to be shoulder bolts and can be bolts that do not have a smooth shank.

FIGS. 3A-3D illustrates a third embodiment of a motor mount 10, which is adjustable. The motor mount 10 is designed for use with single-speed and two-speed landing gear associated with a trailer with a gooseneck hitch. In this embodiment, the right and left edges of the frame bracket 18 are substantially parallel to the right and left edges of the motor bracket 22 to form a generally Z-shaped structure. The second plates 18b, 22b of the frame and motor brackets 18, 22 are secured together with a plurality of bolts 32, preferably shoulder bolts, to accommodate two-speed jack operation. Notably, in this embodiment, the elongated (or slotted) bolt holes 27 associated with the frame bracket 18 enable limited horizontal relative movement of the second plates 18b, 22b. If the landing gear does not support two-speed jack operation, then the bolts 32 do not need to be shoulder bolts and can be bolts that do not have a smooth shank.

In FIGS. 3A-3D, the Z-shaped motor mount 10 is shown as mounted to the frame part 38 on the left side of the jack leg 16, i.e., with the first plate 18a of the frame bracket 18 being secured to frame part 38 on the left side of the jack leg 16. However, in some embodiments, the Z-shaped motor mount 10 can be mounted over the top of the jack leg 16, i.e., with the second plates 18b, 22b situated over the top of the jack leg 16 and with the first plate 18a secured over the jack leg 16. This can be easily accomplished by changing to orientation of how the gearbox 14 is secured to the first plate 22a of the motor bracket 22. Furthermore, in other embodiments, the Z-shaped motor mount 10 is mounted to the frame part 38 on the right side of the jack leg 16, i.e., with the first plate 18a of the frame bracket 18 being secured to frame part 38 on the right side of the jack leg 16.

Figure 4B:
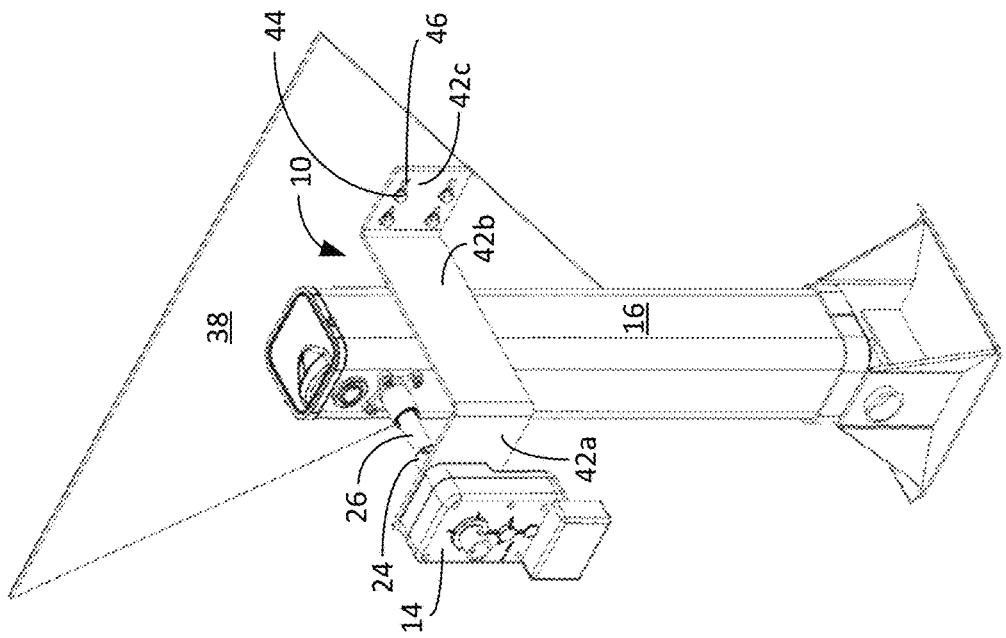
FIGS. 4A-4C shows a fourth embodiment of a motor mount for a single-speed landing gear associated with a trailer with a gooseneck hitch. Specifically.
Figure 4A:
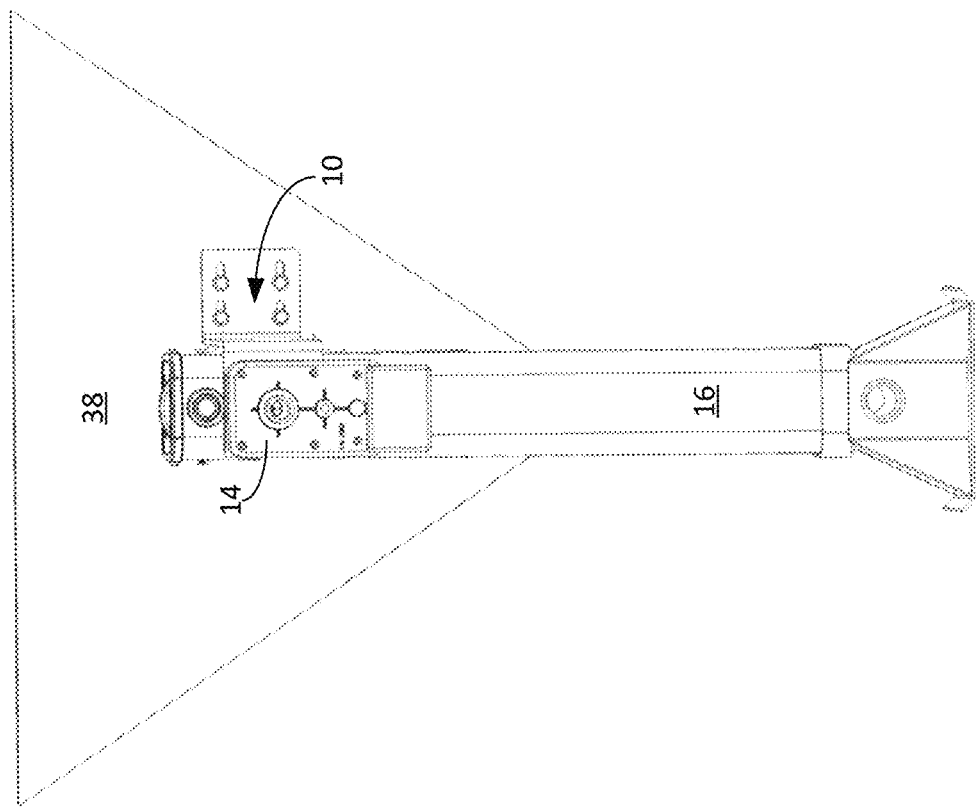
Figure 4C:
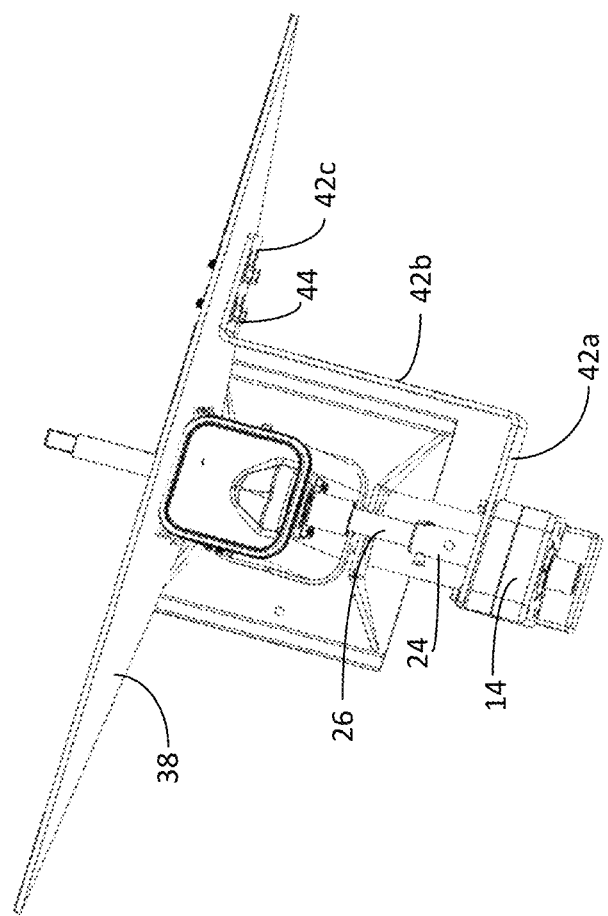

FIGS. 4A-4C is a fourth embodiment of a motor mount 10 for use with single-speed landing gear associated with a trailer with a gooseneck hitch. In this embodiment, the motor mount 10 is preferably a single unitary piece, or one piece, that has a first plate 42a, a second plate 42b, and a third plate 42c, configured as a Z-shaped structure. The first and second plates 42a, 42b are connected substantially at a right angle. The second and third plates 42b, 42c are connected substantially at a right angle. The first and third plates 42a, 42c being positioned substantially parallel. The first, second, and third plates 42a, 42b, 42c can be produced as a singular part or as two or more separate parts that are secured together via any suitable technique, such as welding. The first plate 42a is secured to frame part 38 of the trailer. The first plate 42a is secured to the gearbox 14 with bolts and has an opening therethrough for receiving the coupling 24 associated with the gearbox 14. The third plate is secured to the frame part 38 with bolts 44 extending through bolt holes 46 and with corresponding nuts. Optionally, the bolt holes 46 can be elongated to enable some adjustment of the Z-shaped structure in the horizontal direction during installation.

Another embodiment of the present disclosure is a kit that can be sold to customers. The kit would include the electric motor 13, gearbox 14, the motor mount 10 (as described in connection with any one of the first through fourth embodiments), a set of shoulder bolts, and a set of bolts without a smooth shank. After the customer buys the kit and is in the process of installing the motor mount, the customer will select which set of bolts to utilize to accommodate either single or two-speed jack operation.

It should be emphasized that the above-described embodiments of the present invention, particularly, any "preferred" embodiments, are merely possible nonlimiting examples of implementations, merely set forth for a clear understanding of the principles of the invention. Many variations and modifications may be made to the above-described embodiment(s) of the invention without departing substantially from the spirit and principles of the invention. All such modifications and variations are intended to be included herein within the scope of this disclosure and the present invention.

The invention claimed is:

1. A motorized system for rotating an input shaft associated with landing gear of a trailer, the landing gear having a telescoping jack leg for raising and lowering a front of the trailer when the input shaft is rotated, the system comprising:
   an electric motor;
   an adjustable motor mount that prevents rotation of the motor, the adjustable motor mount comprising:
   a frame bracket having first and second plates, the first and second plates being connected substantially at a right angle, the first plate being secured to a frame part of the trailer;
   a motor bracket having first and second plates, the first and second plates being connected substantially at a right angle, the motor bracket first plate having an opening therethrough, the motor bracket second plate being secured to the frame bracket second plate; and
   a gearbox operatively connected to the electric motor, the gearbox secured to the motor bracket first plate, the gearbox having an outwardly extending drive means that is rotated by the motor in combination with the gearbox, the drive means having an elongated longitudinal body that extends through the opening in the motor bracket first plate, the drive means for connection, directly or indirectly, to and capable of rotating the landing gear input shaft of the trailer;
   wherein each of the second plates of the frame and motor brackets have an elongated longitudinal body having generally planar, opposing, parallel first and second surfaces, the first and second surfaces extending between opposing, parallel, right and left edges and extending between proximal and distal ends in a direction that is orthogonal to the right and left edges, the proximal ends of the second plates of the frame and motor brackets being connected to the first plates of the frame and motor brackets respectively;
   wherein:
   the right and left edges of the frame bracket are substantially orthogonal to the right and left edges of the motor bracket;
   the second plate of the motor bracket comprises a plurality of bolt holes that are elongated in the direction from the proximal end to the distal end; and
   a plurality of bolts extends through respective bolt holes to secure the second plates of the frame and motor brackets while permitting relative horizontal movement of the second plates of the frame and motor brackets in order to accommodate a two speed jack operation where the motor moves horizontally during a switch between gears.

2. The system of claim 1, wherein the drive means is a female coupling.

3. The system of claim 1, wherein the second plates of the frame and motor brackets have a plurality of bolt holes and further comprising:
   a plurality of elongated shoulder bolts, each of the bolts having a head, a smooth shank adjacent the head, and a threaded end region adjacent to the shank for receiving a respective nut, each of the bolts extending through the second plates via corresponding bolt holes;
   a plurality of nuts threaded onto respective bolts;
   wherein the second plates are secured together via the bolts with respective nuts; and
   wherein the bolt holes of the motor bracket are elongated in the direction along an axis that is parallel with the longitudinal body of the drive means so that the shanks of the bolts as well as the motor bracket are permitted to move in a limited manner within the respective elongated bolt holes in the direction toward and away from the input shaft.

4. The system of claim 1, further comprising an adjustment means for enabling the second plates to be secured together at a plurality of different positions relative to each other.

5. The system of claim 1, further comprising a means for permitting limited movement of the second plates relative to each other in a direction toward and away from the input shaft in order to accommodate a two-speed jack operation associated with the landing gear.

6. The system of claim 1, further comprising the trailer and wherein the drive shaft is connected to the landing gear input shaft of the trailer.

7. The system of claim 1, further comprising a material sheet situated between the second plates of the frame and motor brackets that reduces friction to enable easier relative movement.

8. A motorized system for rotating an input shaft associated with landing gear of a trailer, the landing gear having a telescoping jack leg for raising and lowering a front of the trailer when the input shaft is rotated, the system comprising:
   an electric motor;
   an adjustable motor mount that prevents rotation of the motor, the adjustable motor mount comprising:
   an L-shaped frame bracket having first and second plates, the first and second plates being connected substantially at a right angle, the first plate being secured to a frame part of the trailer, the second plate having an elongated longitudinal body with generally planar, opposing, first and second surfaces, the first and second surfaces extending between opposing, right and left edges and extending between proximal and distal ends, the proximal ends being connected to the first plate;
   an L-shaped motor bracket having first and second plates, the motor bracket first and second plates being connected substantially at a right angle, the motor bracket first plate having an opening therethrough, the motor bracket second plate being secured to the frame bracket second plate, the motor bracket second plate having an elongated longitudinal body with generally planar, opposing, first and second surfaces, the motor bracket first and second surfaces extending between opposing, right and left edges and extending between proximal and distal ends, the motor bracket proximal end being connected to the motor bracket first plate;
   a gearbox operatively connected to the electric motor, the gearbox secured to the motor bracket first plate, the gearbox having an outwardly extending drive means that is rotated by the motor and gearbox, the drive means having an elongated longitudinal body that extends through the opening in the motor bracket first plate, the drive means for connection, directly or indirectly, to and capable of rotating the landing gear input shaft of the trailer; and means for securing together the second plates while permitting limited movement of the second plates relative to each other toward and away from the input shaft in order to accommodate a two-speed jack operation associated with the landing gear.

9. The system of claim 8, wherein the drive means is a female coupling.

10. The system of claim 8, wherein:
the right and left edges of the frame bracket are substantially orthogonal to the right and left edges of the motor bracket;
the second plate of the motor bracket comprises a plurality of bolt holes that are elongated in the direction from the proximal end to the distal end; and
a plurality of bolts extends through respective bolt holes to secure the second plates of the frame and motor brackets while permitting relative horizontal movement of the second plates of the frame and motor brackets in order to accommodate a two speed jack operation where the motor moves horizontally during a switch between gears.

11. The system of claim 10, wherein the second plates of the frame and motor brackets have a plurality of bolt holes and further comprising:

a plurality of elongated shoulder bolts, each of the bolts having a head, a smooth shank adjacent the head, and a threaded end region adjacent to the shank for receiving a respective nut, each of the bolts extending through the second plates via corresponding bolt holes;
a plurality of nuts threaded onto respective bolts;
wherein the second plates are secured together via the bolts with respective nuts; and
wherein the bolt holes of the motor bracket are elongated in the direction along an axis that is parallel with the longitudinal body of the drive means so that the shanks of the bolts as well as the motor bracket are permitted to move in a limited manner within the respective elongated bolt holes in the direction toward and away from the input shaft.

12. The system of claim 8, further comprising an adjustment means for enabling the second plates to be secured together at a plurality of different positions relative to each other.

13. The system of claim 8, further comprising the trailer and wherein the drive shaft is connected to the landing gear input shaft of the trailer.

14. The system of claim 8, further comprising a sheet of material situated between the second plates of the frame and motor brackets that reduces friction to enable easier relative movement.

* * * * *